US009086960B2

(12) United States Patent
Mahindru et al.

(10) Patent No.: US 9,086,960 B2
(45) Date of Patent: *Jul. 21, 2015

(54) TICKET CONSOLIDATION FOR MULTI-TIERED APPLICATIONS

(75) Inventors: Ruchi Mahindru, Elmsford, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 13/590,342

(22) Filed: Aug. 21, 2012

(65) Prior Publication Data

US 2014/0059394 A1    Feb. 27, 2014

(51) Int. Cl.
*G06F 11/00* (2006.01)
*G06F 11/07* (2006.01)
*G06F 11/34* (2006.01)

(52) U.S. Cl.
CPC ............ *G06F 11/07* (2013.01); *G06F 11/0709* (2013.01); *G06F 11/0784* (2013.01); *G06F 11/34* (2013.01)

(58) Field of Classification Search
CPC . G06F 11/07; G06F 11/0784; G06F 11/3006; G06F 11/3075; H04L 41/0631
USPC ................ 714/48, 37, 26; 705/7.15
See application file for complete search history.

(56) References Cited

U.S. PATENT DOCUMENTS

| | | | | |
|---|---|---|---|---|
| 5,768,501 | A * | 6/1998 | Lewis | 714/48 |
| 6,353,446 | B1 * | 3/2002 | Vaughn et al. | 715/733 |
| 6,829,734 | B1 * | 12/2004 | Kreulen et al. | 714/46 |
| 7,493,518 | B2 | 2/2009 | Anderson et al. | |
| 7,533,305 | B2 * | 5/2009 | Behdjati et al. | 714/57 |
| 7,627,444 | B2 * | 12/2009 | Dobbins et al. | 702/82 |
| 8,260,773 | B2 * | 9/2012 | Jennings et al. | 707/723 |
| 8,706,726 | B2 * | 4/2014 | Kassam et al. | 707/736 |
| 2003/0110248 | A1 * | 6/2003 | Ritche | 709/224 |
| 2004/0120250 | A1 * | 6/2004 | Langevin et al. | 370/216 |
| 2004/0215768 | A1 * | 10/2004 | Oulu et al. | 709/224 |
| 2007/0078863 | A1 * | 4/2007 | Thompson | 707/100 |
| 2007/0116185 | A1 * | 5/2007 | Savoor et al. | 379/9 |
| 2007/0133755 | A1 * | 6/2007 | Jean et al. | 379/1.01 |
| 2008/0155564 | A1 * | 6/2008 | Shcherbina et al. | 719/318 |
| 2008/0159155 | A1 * | 7/2008 | Bajpay et al. | 370/248 |
| 2008/0263077 | A1 * | 10/2008 | Boston | 707/102 |
| 2008/0298229 | A1 * | 12/2008 | Ballantyne et al. | 370/218 |
| 2009/0055684 | A1 * | 2/2009 | Jamjoom et al. | 714/26 |

(Continued)

OTHER PUBLICATIONS

Office Action dated Jan. 7, 2015 received in the parent U.S. Appl. No. 13/592,578.

*Primary Examiner* — Loan L. T. Truong
(74) *Attorney, Agent, or Firm* — Scully, Scott, Murphy & Presser, P.C.; Louis J. Percello, Esq.

(57) ABSTRACT

Consolidating problem tickets for a multi-tiered application may comprise identifying a plurality of correlated virtual machines that are running one or more application components of the multi-tiered application. Problem reports may be identified that are generated by one or more of the plurality of correlated virtual machines and caused by a failure of a same single component of the multi-tiered application. The identified problem reports may be consolidated into a single ticket and placed into a ticket handling system.

15 Claims, 6 Drawing Sheets

(56) References Cited

U.S. PATENT DOCUMENTS

| | | | |
|---|---|---|---|
| 2009/0238077 A1* | 9/2009 | Bajpay et al. | 370/241 |
| 2010/0037058 A1* | 2/2010 | Zhuk | 713/176 |
| 2010/0161673 A1 | 6/2010 | Kandanala et al. | |
| 2011/0149721 A1* | 6/2011 | Yang et al. | 370/216 |
| 2011/0276699 A1* | 11/2011 | Pedersen | 709/227 |
| 2011/0295898 A1* | 12/2011 | Grabarnik et al. | 707/780 |
| 2012/0054331 A1* | 3/2012 | Dagan | 709/224 |
| 2012/0054785 A1* | 3/2012 | Yang et al. | 725/16 |
| 2012/0233508 A1* | 9/2012 | Khatri et al. | 714/49 |
| 2013/0046764 A1* | 2/2013 | Choi et al. | 707/740 |
| 2013/0166447 A1* | 6/2013 | Theado et al. | 705/44 |
| 2013/0179736 A1* | 7/2013 | Gschwind et al. | 714/37 |
| 2013/0305080 A1* | 11/2013 | Behrendt et al. | 714/2 |
| 2014/0039957 A1* | 2/2014 | Bivens et al. | 705/7.15 |
| 2014/0039958 A1* | 2/2014 | Bivens et al. | 705/7.15 |

\* cited by examiner

TICKET CONSOLIDATION FOR MULTI-TIERED APPLICATIONS

FIELD

The present application relates generally to computers, and computer applications, and more particularly to ticket consolidation for multi-tiered applications.

BACKGROUND

In a data center with virtual environment, or in an environment with traditional physical servers, a system support or the like functionality monitors computing operations and generates tickets for events causing problems to be resolved by system administrators. Usually, every open problem ticket has to be handled by system administrators independently even if that problem was resolved in the meantime. Such individual handling costs time and effort.

In information technology (IT) management, enterprises are moving from physical servers toward virtualization, virtual machines (VMs) and cloud computing. Cloud computing generally refers to a model of service delivery for enabling convenient, on-demand network access to a shared pool of configurable computing resources (e.g. networks, network bandwidth, servers, processing, memory, storage, applications, virtual machines, and services). Cloud computing infrastructure may comprise of a network of interconnected nodes. Virtual environment provided, for example, via the cloud computing reduces cost through better resource utilization, standardization and simplified maintenance. In strategic outsourcing (SO) and cloud environment also, problem tickets are opened for events causing problems, to be resolved by system administrators.

BRIEF SUMMARY

A method of consolidating problem tickets for a multi-tiered application, in one aspect, may comprise identifying a plurality of correlated virtual machines that are running one or more application components of the multi-tiered application. The method may also comprise identifying problem reports generated by one or more of the plurality of correlated virtual machines and caused by a failure of a same single component of the multi-tiered application. The method may further comprise consolidating the identified problem reports into a single ticket. The method may further comprise placing the single ticket into a ticket handling system.

A method of consolidating problem tickets for a multi-tiered application, in another aspect, may comprise identifying a plurality of application components of the multi-tiered application. The method may further comprise identifying problem reports generated by one or more of the plurality of application components of the multi-tiered application and caused by a failure of a same single component of the multi-tiered application. The method may also comprise consolidating the identified problem reports into a single ticket.

A method of consolidating problem tickets for a multi-tiered application, yet in another aspect, may comprise identifying a plurality of virtual machines that are correlated. The method may also comprise monitoring operations of the plurality of virtual machines. The method may also comprise detecting a problem report generated from one or more of the plurality of virtual machines. The method may further comprise determining whether a problem associated with the problem report exists as a problem entry associated with one or more of the plurality of virtual machines. The method may also comprise, in response to determining that the problem associated with the problem report exists, determining whether a generation time of the problem report is within a sensitivity time window with respect to the problem entry associated one or more of the plurality of virtual machines, and in response to determining that the generation time of the problem report is within a sensitivity time window, identifying a problem ticket associated with the problem entry and consolidating the problem associated with the problem report into the identified problem ticket. The method may further comprise, in response to determining that the problem associated with the problem report does not exist, adding the problem report as a new problem entry, and generating a new problem ticket associated with the problem report.

A system for consolidating problem tickets for a multi-tiered application, in one aspect, may comprise a ticket consolidator module operable to execute on the processor and further operable to identify a plurality of application components of the multi-tiered application, identify problem reports generated by one or more of the plurality of application components of the multi-tiered application and caused by a failure of a same single component of the multi-tiered application, and consolidate the identified problem reports into a single ticket.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In a virtualized environment, several operating system (OS) images or VMs may be executed concurrently on the same physical server. Also, enterprises may run multi-tiered enterprise applications. For example, an application may use WebSphere™, DB2™, and an Hypertext Transfer Protocol (HTTP) server for its functions; A single DB2™ may interact with multiple WebSphere™ clients. Each of these applications may be executed in a separate VM. A failure on any of these application components can affect the whole application. A single failure can cause several servers to report problems, each open problem ticket to be handled by system administrators. In one embodiment of the present disclosure, tickets that have the same or similar root cause of problems from multiple systems may be consolidated. Fixing the root cause once may resolve those multiple tickets. Thus, the methodology of the present disclosure that addresses problem tickets caused by the same failure in a compute environment can save unnecessary work of system administrators.

It is understood in advance that although this disclosure includes a description on cloud computing, implementation of the teachings recited herein are not limited to a cloud computing environment. Rather, embodiments of the present disclosure are capable of being implemented in conjunction with any other type of computing environment now known or later developed.

In one aspect, a methodology is disclosed that correlates the ticket information about executing multi-tiered applications. Problems, e.g., runtime problems occurring in a computing environment may be reported and problem tickets may be opened to address the problems. A ticket consolidator may analyze problem reports, and identify problem tickets that belong to different tiers of a single application, and identify related problem tickets which are caused by dependency between these applications. The related tickets reporting different problems related to failure of the same part of a single multi-tiered application may be consolidated into a single representative problem ticket, which may be given a higher priority, and entered into a problem ticket handling system.

Figure 1:
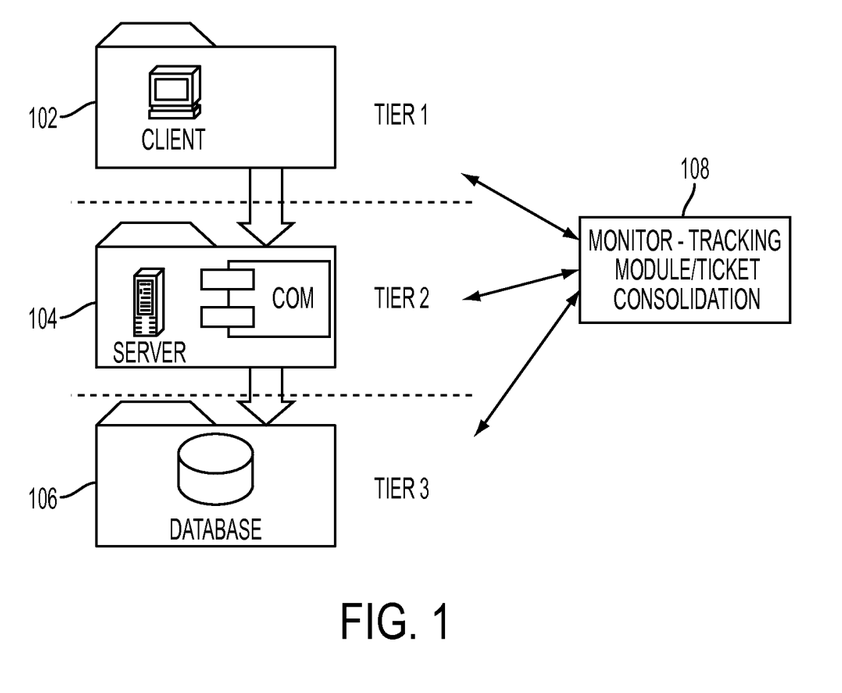
FIG. 1 is an overview diagram illustrating example multi-tiered applications and a ticket consolidation mechanism of the present disclosure in one embodiment.

FIG. 1 is an overview diagram illustrating example multi-tiered applications and a ticket consolidation mechanism of the present disclosure in one embodiment. A multi-tier application runs multiple application component, for example, across different physical and/or virtual machines. For example, enterprise software application may be broken down to different layers such as presentation layer, business logic layer and data layer. FIG. 1, for example, illustrates a multi-tier application with a client layer 102, server logic layer 104 and database layer 106, which may be divided into discrete logical parts and executed across different physical machines and/or virtual machines. A failure on any one of an application component or layer may impact the entire application, and two or more application components may report problems, which for example, are problems resulting from the same root cause because of their dependencies. A ticket consolidator 108 of the present disclosure in one embodiment may monitor and track problem reports that are generated in the different components 102, 104, 106, identify correlated components and consolidate problem tickets from the correlated components.

Figure 2:
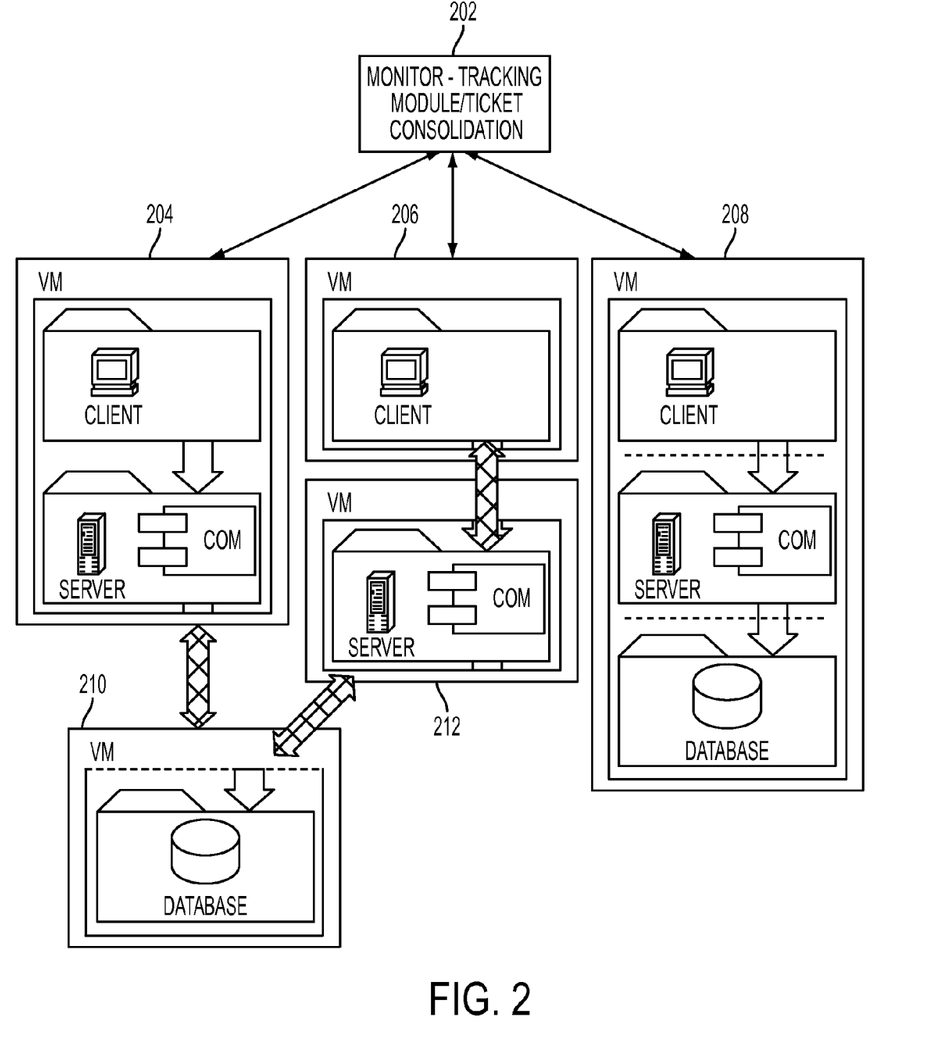
FIG. 2 is an overview diagram illustrating example multi-tiered applications in multiple VM environment and a ticket consolidation mechanism of the present disclosure in one embodiment.

FIG. 2 illustrates example multi-tiered applications in multiple VM environment and a ticket consolidation mechanism of the present disclosure in one embodiment. A VM at 204 may run both a client component and server component of an application, while another VM at 210 may run a database component which the application components running on VM at 204 may access. Another example architecture of a multi-tiered application is illustrated by VMs at 206, 212 and 210. A client component of an application may run on a VM at 206, which communicates with a server component of the application running on a VM at 212. The server component of the application running on a VM at 212 in turn communicates a database application running on yet another VM at 210. In another example multi-tier application architecture, a VM at 208 runs a client component, server component, and a database component of the application in the same VM. A ticket consolidator 202 of the present disclosure in one embodiment may monitor and track problem reports that are generated in the different components, identify correlated VMs and consolidate problem tickets from the correlated VMs. For instance, the VM at 204, the VM at 206 and the VM at 210 may be identified as correlated since the applications running on VM at 204, the application running on VM at 206, and the application running on VM at 212 all directly or indirectly have dependencies on the database application running on VM at 210. A problem occurring in VM at 210 may also trigger problems to be reported at those correlated VMs. The ticket consolidator 202 of the present disclosure may consolidate those problem reports into a single ticket.

As another example, a failure in one component of the application on VM at 208 may also cause a failure in another component on the same VM at 208, and trigger problem reports to be generated from two or more of those components, even though the root cause of the problem may be the same. The ticket consolidator 202 of the present disclosure may identify problem reports from multiple components that have the same root cause and consolidate the problems into a single ticket.

Figure 3:
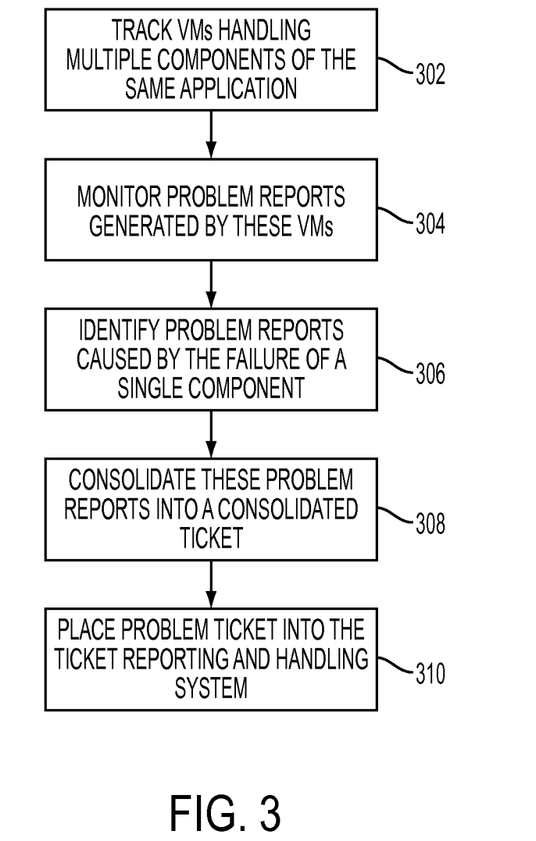
FIG. 3 is a flow diagram illustrating a ticket consolidation mechanism in one embodiment of the present disclosure.

FIG. 3 is a flow diagram illustrating a ticket consolidation mechanism in one embodiment of the present disclosure, for example, consolidation tickets generated due to an error on multi-tiered application. At 302 VMs handling multiple components of the same application are tracked. For example, VMs are identified that are running one or more of the multiple components of a single application, and those VMs may be correlated. In another example, if multiple components are running on a single VM, those components are identified as correlated.

At 304, problem reports or like events generated by those identified VMs or components are monitored. For example, if one component experiences a problem or failure, such problem or failure may cause other components to report problems as well.

At 306, problem reports are identified that are caused by the failure of a single component of the related multi-tiered components. This may be done, for instance, by performing a root cause analysis for each of the problem reports.

At 308, the identified problem reports are consolidated into a single ticket. For instance, a ticket is generated that consolidates the identified problem reports. Examples of types of problems which can be consolidated may include but are not limited to a database (e.g., DB2™) hanging or running slowly, and one or more servers (WebSphere™) reporting network timeout.

At 310, the ticket is placed into a ticket reporting and handling system.

Figure 4:
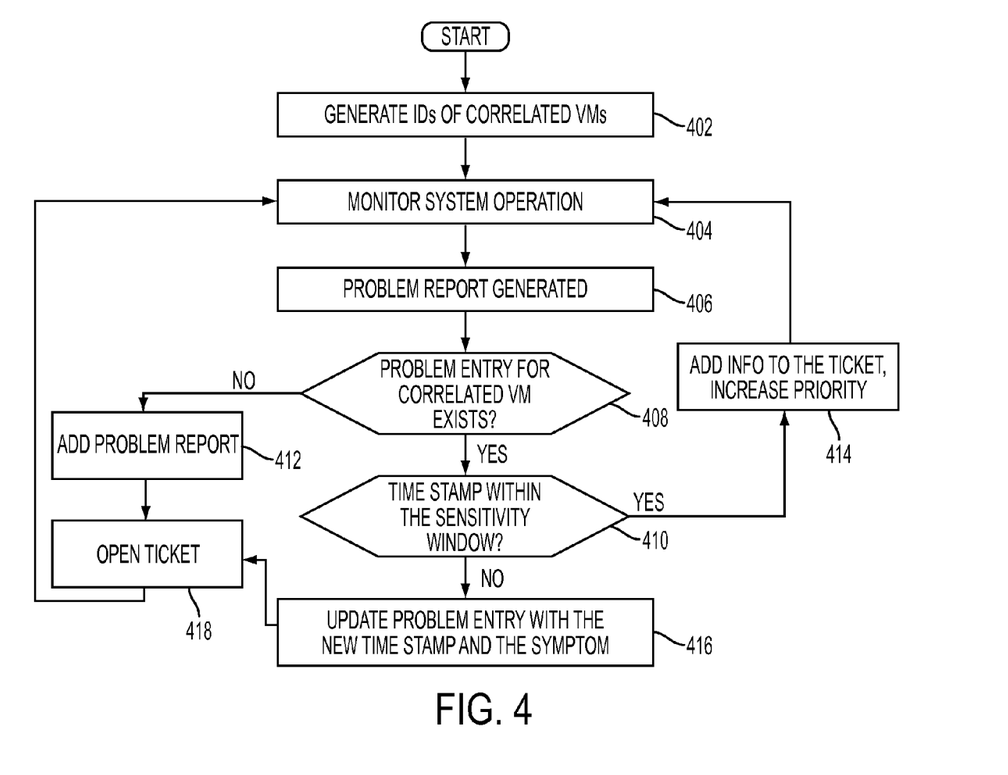
FIG. 4 illustrates a methodology of ticket consolidation in detail in one embodiment of the present disclosure.

FIG. 4 illustrates a methodology of ticket consolidation in detail in one embodiment of the present disclosure. At 402, a list of VM identifiers (IDs) that are correlated is generated. For instance, a VM may be identified as being correlated to another VM, if the former runs an application that has dependency on, or communicate with, another application run on the latter, or vice versa. Those VMs need not be running on the same hypervisor; Rather, they can be running across multiple hypervisors. In addition, these VMs can be located on the same or on different physical machines, and can run in multiple different clusters.

At 404, operations in the computing environment are monitored. At 406, a problem report generated in the computing environment is detected. The problem report may be an alert or an event or the like generated by a system motoring module. At 408, it is determined whether there exists a problem entry similar to the problem report detected, associated with a correlated VM. If it is determined that a problem entry for a correlated VM exists, it is determined whether the time associated with the problem entry is within a sensitivity window at 410. The sensitivity window may be a threshold specifying a time window, a time range or period. The sensitivity window is configurable and/or programmable in one embodiment, for example, depending on the type of problem.

In one aspect, as an example, a data structure table may be generated and utilized for determining correlated VMs, existing problem entries associated with the correlated VMs, and comparing time sensitivity windows.

If the problem entry's time is within the sensitivity window, information associated with the detected problem report is added to a problem ticket associated with the problem entry, and the ticket's priority is increased at 414. The logic proceeds to 404 to continue the monitoring.

If the problem entry's time is not within the sensitivity window, the problem entry is updated with a new time stamp and symptom associated with the detected problem report. The logic proceeds to 418, where a problem ticket associated with the updated problem entry is opened.

If it is determined that a problem entry for a correlated VM does not exist, the problem report is added at 412, for instance, into a database of problem reports. At 418, a ticket is opened for the problem entry.

Example data structures may include a table that lists correlated active VMs handling different components of a multi-tier application. The table may record VM identifiers and associated hypervisors. The same or another table may record dependencies among different components running on different VMs. Yet another table (referred to as a problem reports table) may list problem reports or problems reported by those VMs. Such problem reports table may track an event, problem symptom, and time stamp (e.g., the time the problem report was generated) associated with a reported problem. It should be understood that different data structures may be utilized for keeping records of correlated VMs, application components, problem reports and associated information.

The problem reports table may be checked and updated for each newly generated problem report. If there is an existing entry for a component application or VM with the correlated symptom recorded in the table, and its time stamp is within sensitivity time window, the problem report may be consolidated into the existing entry, and the ticket associated with the existing entry may be updated to include the information associated with the problem report.

If not, a new entry associated with the problem report is added to the problem reports table. A ticket may be generated for this problem report and placed into the ticket reporting and handling system for appropriate action by a system administrator or the like.

Figure 5:
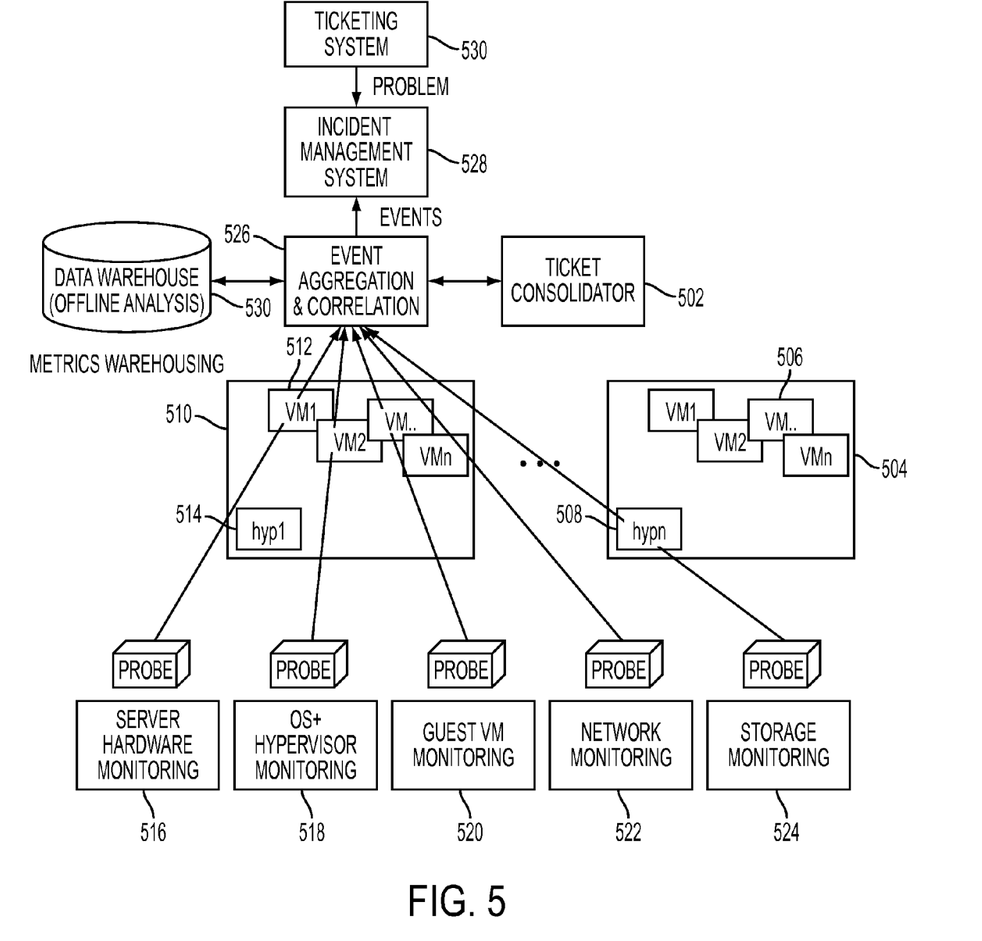
FIG. 5 is an architectural diagram illustrating ticket consolidation system in one embodiment of the present disclosure.

FIG. 5 is an architectural diagram illustrating ticket consolidation system in one embodiment of the present disclosure. A computing environment may include one or more physical machines, e.g., 510, 504. A physical machine 510 may run a hypervisor 514, which can have a plurality of virtual machines 512 running on the hypervisor 514. Similarly, a physical machine 504 may run a hypervisor 508, which can have a plurality of virtual machines 506 running on the hypervisor 508. Various monitoring modules may monitor a computing environment via respective probes. Monitoring modules may include, but are not limited to, a server hardware monitoring module 516, which for example, may monitor server hardware for performance, problems or any other events related to the computing environment's server hardware; an operating system/hypervisor monitoring module 518 that may monitor one or more operating systems and hypervisors; a guest VM monitoring module 520 that may monitor VMs; a network monitoring module 522 that may monitor network elements and traffic; and a storage monitoring module 524 that may monitor storage devices and related performance and traffic. Those various monitoring modules may look for problems, determine what is happening in the system with respect to the devices that the monitoring modules are monitoring, and may generate one or more events and/or logs related to their monitoring, e.g., if abnormal behavior is detected. Those monitoring modules may also automatically generate problem tickets. The generated events and/or logs may be stored in storage 530, for example, a data warehouse or another storage.

Event aggregation and correlation module 526 may receive the events and/or logs from one or more monitoring modules, identify problematic events and/or logs and send those events that are determined to be abnormal events, for instance, those that indicate behavior of the devices that might signal a problem to an incident management system 528. Similarly, a ticketing system module 530 may also generate one or more events or problem logs based on customer reports and send the one or more events to the incident management system 528. The incident management system 528 may create tickets associated with the events it receives, and open the tickets, for instance, to be handled by a system administrator or the like.

A ticket consolidator 502 of the present disclosure monitors events or problem reports received from the monitoring modules (e.g., 516, 518, 520, 522, 524) and identifies those from a multi-tiered application, e.g., cause by a component of in the multi-tiered application, and consolidate them as discussed above.

Figure 6:
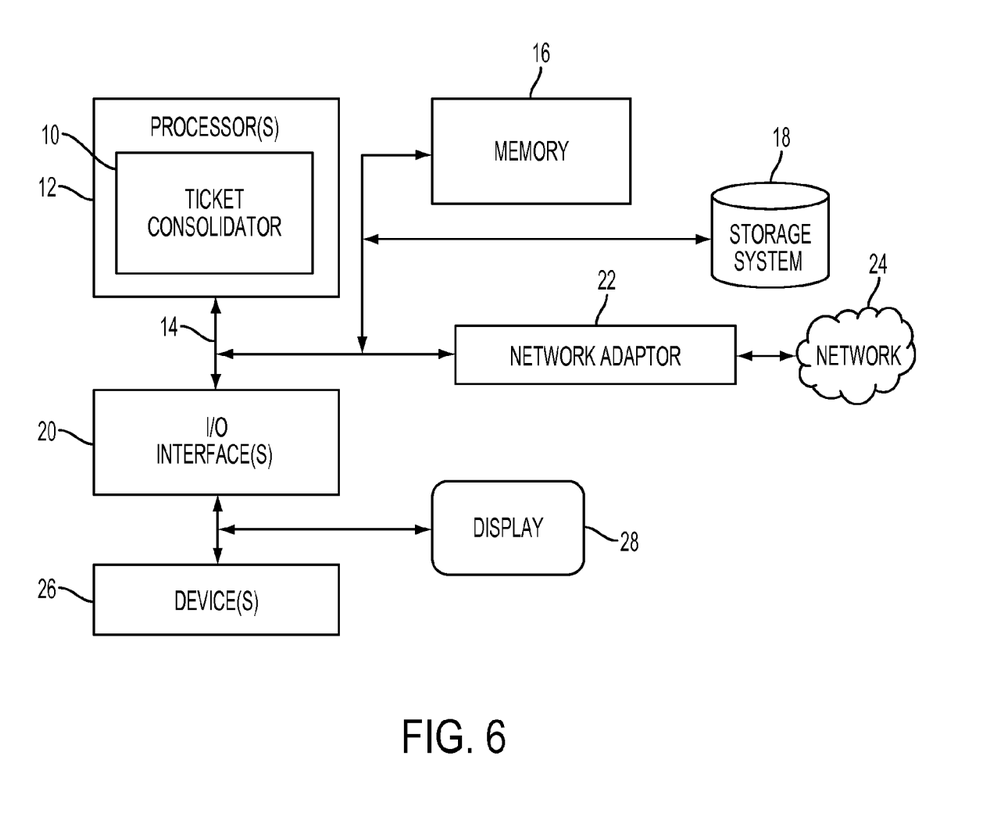
FIG. 6 illustrates a schematic of an example computer or processing system that may implement the ticket consolidation system in one embodiment of the present disclosure.

FIG. 6 illustrates a schematic of an example computer or processing system that may implement the ticket consolidation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a ticket consolidator module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of consolidating problem tickets for a multi-tiered application, comprising:

identifying a plurality of correlated virtual machines that are running one or more application components of the multi-tiered application;

identifying problem reports generated by one or more of the plurality of correlated virtual machines and caused by a failure of a same single component of the multi-tiered application;

consolidating the identified problem reports into a single ticket; and placing the single ticket into a ticket handling system, the consolidating comprising determining whether a problem associated with the identified problem reports exist as a problem entry associated with one or more of the plurality of correlated virtual machines and determining whether generation times of the problem reports are within a sensitivity time window with respect to the problem entry associated with one or more of the plurality of virtual machines, and in response to determining that the generation time of the problem report is within a sensitivity time window, identifying the single ticket associated with the problem entry and consolidating the problem associated with the problem reports into the single ticket, and in response to determining that the generation times of the problem reports are not within the sensitivity time window with respect to the problem entry, updating the problem entry with a new timestamp and information associated with the problem reports, and opening a new ticket associated with the updated problem entry.

2. The method of claim 1, wherein the identifying the problem reports that are caused by a failure of a same single component of the multi-tiered application comprises performing a root cause analysis of one or more problems reported in the problem reports.

3. The method of claim 1, wherein the identifying the problem reports that are caused by a failure of a same single component of the multi-tiered application comprises performing ticket correlation of one or more problems reported in the problem reports.

4. The method of claim 1, wherein the consolidating the identified problem reports into a single ticket comprises consolidating the identified problem reports into a single ticket in response to determining that the identified problem reports were generated within a defined time window.

5. The method of claim 4, wherein the defined time window is configurable.

6. The method of claim 1, wherein the plurality of correlated virtual machines run across different hypervisors.

7. The method of claim 1, wherein the correlated virtual machines are identified based on one or more dependencies existing among said one or more application components running on said virtual machines.

8. A method of consolidating problem tickets for a multi-tiered application, comprising:
   identifying a plurality of application components of the multi-tiered application;
   identifying problem reports generated by one or more of the plurality of application components of the multi-tiered application and caused by a failure of a same single component of the multi-tiered application; and
   consolidating the identified problem reports into a single ticket,
   the consolidating comprising determining whether a problem associated with the identified problem reports exist as a problem entry associated with the multi-tiered application and determining whether generation times of the problem reports are within a sensitivity time window with respect to the problem entry associated with the multi-tiered application, and in response to determining that the generation time of the problem report is within a sensitivity time window, identifying the single ticket associated with the problem entry and consolidating the problem associated with the problem reports into the single ticket, and in response to determining that the generation times of the problem reports are not within the sensitivity time window with respect to the problem entry, updating the problem entry with a new timestamp and information associated with the problem reports, and opening a new ticket associated with the updated problem entry.

9. The method of claim 8, further comprising placing the single ticket into a ticket handling system.

10. The method of claim 8, wherein the identifying the problem reports that are caused by a failure of a same single component of the multi-tiered application comprises performing a root cause analysis of one or more problems reported in the problem reports.

11. The method of claim 8, wherein the consolidating the identified problem reports into a single ticket comprises consolidating the identified problem reports into a single ticket in response to determining that the identified problem reports were generated within a defined time window.

12. The method of claim 11, wherein the defined time window is configurable.

13. A method of consolidating problem tickets for a multi-tiered application, comprising:
   identifying a plurality of virtual machines that are correlated;
   monitoring operations of the plurality of virtual machines;
   detecting a problem report generated from one or more of the plurality of virtual machines;
   determining whether a problem associated with the problem report exists as a problem entry associated with one or more of the plurality of virtual machines;
   in response to determining that the problem associated with the problem report exists, determining whether a generation time of the problem report is within a sensitivity time window with respect to the problem entry associated with one or more of the plurality of virtual machines, and in response to determining that the generation time of the problem report is within a sensitivity time window, identifying a problem ticket associated with the problem entry and consolidating the problem associated with the problem report into the identified problem ticket;
   in response to determining that the problem associated with the problem report does not exist, adding the problem report as a new problem entry, and generating a new problem ticket associated with the problem report; and
   in response to determining that the generation time of the problem report is not within a sensitivity time window, updating the problem entry with a new timestamp and information associated with the problem report, and opening a new ticket associated with the updated problem entry.

14. The method of claim 13, wherein the new timestamp includes the generation time of the problem report.

15. The method of claim 13, wherein the identifying a plurality of virtual machines that are correlated comprises determining one or more dependencies existing among application components of the multi-tiered application running across the plurality of virtual machines.

* * * * *